United States Patent
K T et al.

(10) Patent No.: US 12,555,025 B2
(45) Date of Patent: Feb. 17, 2026

(54) METHOD AND SYSTEM FOR INTEGRATING FIELD PROGRAMMABLE ANALOG ARRAY WITH ARTIFICIAL INTELLIGENCE

(71) Applicant: HCL Technologies Limited, New Delhi (IN)

(72) Inventors: Gandhi Karuna K T, Chennai (IN); Veerendra Prasad Nettem, Chennai (IN); Nataraj Pinakapani, Chennai (IN); Saravanan K, Chennai (IN)

(73) Assignee: HCL Technologies Limited, New Delhi (IN)

( * ) Notice: Subject to any disclaimer, the term of this patent is extended or adjusted under 35 U.S.C. 154(b) by 1104 days.

(21) Appl. No.: 17/095,976

(22) Filed: Nov. 12, 2020

(65) Prior Publication Data

US 2022/0108211 A1    Apr. 7, 2022

(51) Int. Cl.
*G06N 20/00*    (2019.01)
*G06F 7/57*    (2006.01)
*G06F 30/367*    (2020.01)

(52) U.S. Cl.
CPC ............. *G06N 20/00* (2019.01); *G06F 7/57* (2013.01); *G06F 30/367* (2020.01)

(58) Field of Classification Search
None
See application file for complete search history.

(56) References Cited

U.S. PATENT DOCUMENTS

| | | |
|---|---|---|
| 5,155,802 A | 10/1992 | Mueller et al. |
| 5,959,871 A | 9/1999 | Pierzchala et al. |
| 10,068,667 B2 | 9/2018 | Peterson et al. |
| 2008/0294579 A1 | 11/2008 | Rapoport et al. |
| 2017/0206615 A1* | 7/2017 | Sloop .................. F24F 11/30 |
| 2019/0201123 A1 | 7/2019 | Shelton, IV et al. |
| 2019/0227528 A1 | 7/2019 | Abbott et al. |

(Continued)

FOREIGN PATENT DOCUMENTS

WO    2020028505 A1    2/2020

OTHER PUBLICATIONS

Farago, C. et al., "An evolutionary FPAA reconfiguration algorithm based on the open traveling salesman problem," Acta Technica Napocensis, Electronics and Communications, vol. 56, No. 1 (2015) pp. 21-28. (Year: 2015).*

(Continued)

*Primary Examiner* — Brian M Smith
(74) *Attorney, Agent, or Firm* — Kendal M. Sheets (57) ABSTRACT

A method and system for integrating Field Programmable Analog Array (FPAA) with Artificial Intelligence (AI) is disclosed. In some embodiments, the method includes automatically creating, by an AI model, a function by auto connecting a first set of computation elements from a plurality of computational elements in an FPAA, in response to receiving an input. The method further includes receiving a feedback comprising a first accuracy level associated with the output. The method further includes automatically adjusting at least one of a plurality of control parameters to modify the function to generate an adjusted output corresponding to the input, based on the first accuracy level associated with the output.

16 Claims, 8 Drawing Sheets

(56) References Cited

U.S. PATENT DOCUMENTS

2020/0118224 A1    4/2020  Cella
2021/0158207 A1*  5/2021  Alsahlawi .............. G06N 20/00

OTHER PUBLICATIONS

Hasler, J. et al., "VMM + WTA embedded classifiers learning algorithm implemented on SoC FPAA devices," IEEE Journal on Emerging and Selected Topics in Circuits and Systems, vol. 8, No. 1 (Mar. 2018) pp. 65-76. (Year: 2018).*
Ramakrishnan, S. et al., "Vector-matrix multiply and winner-take-all as an analog classifier," IEEE Trans. on Very Large Scale Integration (VLSI) Systems, vol. 22, No. 2 (Feb. 2014) pp. 353-361. (Year: 2014).*
Stoica, A. et al., "Evolvable hardware technique for on-chip automated reconfiguration of programmable devices," Soft Computing, vol. 8 (2004) pp. 354-365. (Year: 2004).*
Stein, M. et al., "Mitigating temperature impact on analog filters using a genetic algorithm on a continuous-time FPAA," PRIME 2012; 8th Conf. on PhD. Research in Microelectronics & Electronics (Jul. 6, 2012) 4 pp. (Year: 2012).*
US 8,285,534, Oct. 9, 2012, Eunhee Kim (withdrawn)
Dean R. D'mello, "Design Approaches to Field-Programmable Analog Integrated Circuits".
Michiel Steyaert, "Analog Circuit Design".
Puxuan Dong, "Implementation of Artificial Neural Network for Real Time Applications Using Field Programmable Analog Arrays".
D.N. Abramson, "A field-programmable analog array using translinear elements".

* cited by examiner

METHOD AND SYSTEM FOR INTEGRATING FIELD PROGRAMMABLE ANALOG ARRAY WITH ARTIFICIAL INTELLIGENCE

TECHNICAL FIELD

Generally, the invention relates to Artificial Intelligence (AI). More specifically, the invention relates to method and system for integrating Field Programmable Analog Array (FPAA) with AI.

BACKGROUND

The emergence of Artificial Intelligence (AI) has led to development of applications that are swiftly being integrated in on our day to day lives. AI is being used to design systems that have ability to simulate human intelligence. In other words, AI helps to build intelligent and self-learning systems that replicate capabilities of a human brain. As a result, in today's world, AI designed systems are on a rise. A subset of AI, called machine learning, enables machines to automatically learn from data, thereby improving its outcome without being explicitly programmed. Moreover, owing to availability of computational power in current times, varied implementation of machine learning algorithms is ranging from handheld devices to Internet of Things (IOT) applications. AI systems, for example, may be described as decision making engines that takes huge amount of input data and then learn or self-learn (based on prior training or past data) to provide best possible output. Some examples of end applications of AI may include, but are not limited to voice recognition, computer vision, process control, robotics, medical, and legal diagnostics.

Currently available high-end processors, for example, Graphical Processing Units (GPUs), are capable of fulfilling only certain mid-level requirements of AI. Moreover, critical requirements of AI, which include lot of parallel processing and churning of a huge amount of data, require a unique architecture. Digital computers, which we all depend upon, sequentially operate on binary data, i.e., one and zero, and is limited by clock rate, which is further limited by laws of physics. With advancement in AI engines, the clock rate required by AI engines will require one and zero to travel faster than light, which based on our current understanding of physics is impossible. Moreover, processing capability of digital computers is constrained because of electronic manufacturability. Therefore, for AI applications, sequential operation of current digital computer architecture may require millions of transistors which eventually will result in very high power and deep cut on reliability.

Due to limitations mentioned above there is need for a replacement of current computational methods by a more efficient and reliable computation method for AI based applications.

SUMMARY OF INVENTION

In one embodiment, a method of integrating Field Programmable Analog Array (FPAA) with Artificial Intelligence (AI). The method may include automatically creating, by an AI model, a function by auto-connecting a first set of computation elements from a plurality of computational elements in an FPAA, in response to receiving an input. It should be noted, the function generates an output associated with the input. The method may include receiving, by the AI model, a feedback comprising a first accuracy level associated with the output. The method may further include automatically adjusting, by the AI model, at least one of a plurality of control parameters to modify the function to generate an adjusted output corresponding to the input, based on the first accuracy level associated with the output.

In another embodiment, a single integrated circuit for integrating FPAA with AI is disclosed. The single Integrated Circuit includes an FPAA comprising a plurality of computational elements and an AI model comprising an AI learning engine. The AI model configured to automatically create a function by auto-connecting a first set of computation elements from a plurality of computational elements in an FPAA, in response to receiving an input. It should be noted that, the function generates an output associated with the input. The stored instructions further cause the single Integrated Circuit to receive a feedback comprising a first accuracy level associated with the output. The stored instructions further causes the single Integrated Circuit to automatically adjust at least one of a plurality of control parameters to modify the function to generate an adjusted output corresponding to the input, based on the first accuracy level associated with the output.

In yet another embodiment, an AI accelerator for integrating FPAA with AI is disclosed. The AI accelerator includes an FPAA comprising a plurality of computational elements and an AI model comprising an AI learning engine. The AI model configured to automatically create a function by auto-connecting a first set of computation elements from a plurality of computational elements in an FPAA, in response to receiving an input. It should be noted that, the function generates an output associated with the input. The stored instructions further cause the AI accelerator to receive a feedback comprising a first accuracy level associated with the output. The stored instructions further causes the AI accelerator to automatically adjust at least one of a plurality of control parameters to modify the function to generate an adjusted output corresponding to the input, based on the first accuracy level associated with the output.

It is to be understood that both the foregoing general description and the following detailed description are exemplary and explanatory only and are not restrictive of the invention, as claimed.

BRIEF DESCRIPTION OF THE DRAWINGS

The present application can be best understood by reference to the following description taken in conjunction with the accompanying drawing figures, in which like parts may be referred to by like numerals

DETAILED DESCRIPTION OF THE DRAWINGS

The following description is presented to enable a person of ordinary skill in the art to make and use the invention and is provided in the context of particular applications and their requirements. Various modifications to the embodiments will be readily apparent to those skilled in the art, and the generic principles defined herein may be applied to other embodiments and applications without departing from the spirit and scope of the invention. Moreover, in the following description, numerous details are set forth for the purpose of explanation. However, one of ordinary skill in the art will realize that the invention might be practiced without the use of these specific details. In other instances, well-known structures and devices are shown in block diagram form in order not to obscure the description of the invention with unnecessary detail. Thus, the invention is not intended to be limited to the embodiments shown but is to be accorded the widest scope consistent with the principles and features disclosed herein.

While the invention is described in terms of particular examples and illustrative figures, those of ordinary skill in the art will recognize that the invention is not limited to the examples or figures described. Those skilled in the art will recognize that the operations of the various embodiments may be implemented using hardware, software, firmware, or combinations thereof, as appropriate. For example, some processes can be carried out using processors or other digital circuitry under the control of software, firmware, or hardwired logic. (The term "logic" herein refers to fixed hardware, programmable logic and/or an appropriate combination thereof, as would be recognized by one skilled in the art to carry out the recited functions.) Software and firmware can be stored on computer-readable storage media. Some other processes can be implemented using analog circuitry, as is well known to one of ordinary skill in the art. Additionally, memory or other storage, as well as communication components, may be employed in embodiments of the invention.

Figure 1:
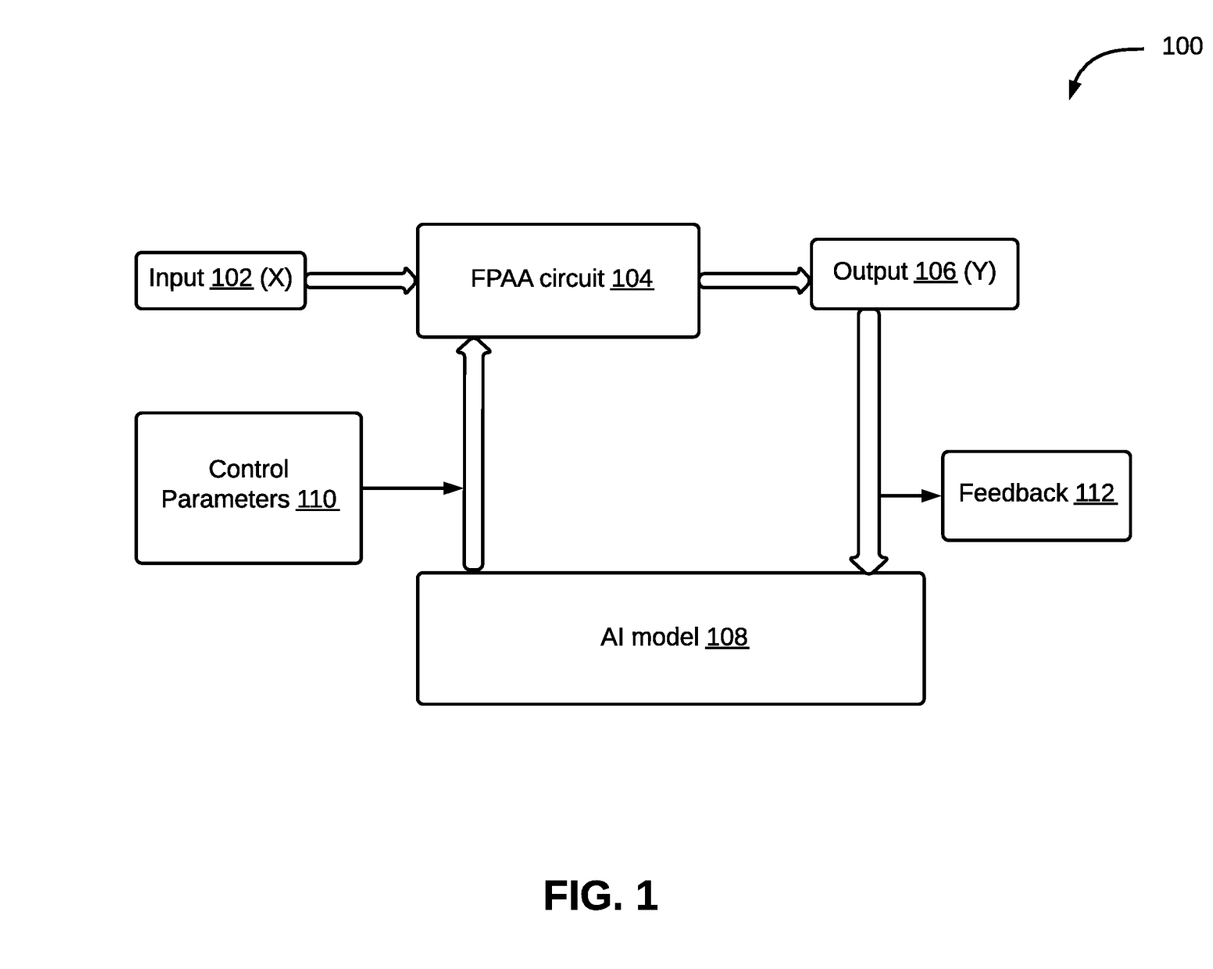
FIG. 1 is a system depicting integration of Field Programmable Analog Array (FPAA) with Artificial Intelligence (AI), in accordance with an embodiment.

A system 100 depicting integration of a Field Programmable Analog Array (FPAA) circuit 104 with an Artificial Intelligence (AI) model 108, is illustrated in FIG. 1, in accordance with an embodiment. The system 100 for example, may correspond to a single integrated circuit, a co-processor, or an AI accelerator embedded in a large integrated circuit. The FPAA circuit 104, for example, may be an Field Programmable Translinear Array (FPTA) circuit. In an embodiment, the system 100 integrates the FPAA circuit 104 with the AI model 108 to provide analog computation for AI based applications. In the system 100, an input 102 (X) is received by the FPAA circuit 104. Based on the input 102 (X), the FPAA circuit 104 generates an output 106 (Y), which is iteratively revised by the AI model 108 based on control parameters 110 and feedback 112 related to accuracy of the output 106 (Y).

The AI model 108 may be initially trained to generate an output based on an input. This has been explained in detail in conjunction with FIG. 4 and FIG. 5. In an embodiment, initially the AI model 108 may receive the input 102 (X), based on which the AI model 108 may automatically create a function in the FPAA circuit 104 to generate the output (Y) 104 for the input (X) 102.

The AI model 108 may create the function for generating the output 104 (Y) by auto connecting a first set of computational elements within the FPAA circuit 104, which may be selected from a plurality of computational elements in the FPAA circuit 104. Each of the plurality of computational elements may be configured to perform one of, but are not limited to subtraction, addition, multiplication, division, or logarithmic computation. It will be apparent to a person skilled in the art that multiple such computational elements and their combinations may be implemented within the FPAA circuit 104.

The function, after being created, may be executed by the AI model 108 on the input 102 (X) in order to generate the output 104 (Y). Once the output 104 (Y) is generated, the AI model 108 may receive the feedback 112 that may include a first accuracy level associated with the output 104 (Y). Upon receiving the feedback, the AI model 108 may analyze the feedback 112 in order to determine whether the output 104 (Y) matches with the target output (i.e., a correct output) or is an erroneous output. In an embodiment, the AI model 108 may compare the first accuracy level with a predefined accuracy threshold. When the first accuracy level is less than the predefined accuracy threshold, the AI model 108 may determine that the output 104 (Y) is erroneous. However, when the first accuracy level is greater than or equal to the predefined accuracy threshold, the AI model 108 may determine that the output 104 (Y) is tending towards accuracy.

In order to analyze the feedback 112, the AI model 108 may evaluate the first accuracy level associated with the output 104 (Y). In one embodiment, based on analysis performed, when the output 104 (Y) is identified as the target output or when the first accuracy level is above the predefined accuracy threshold, the system 100 may generate the output 104 (Y). In another embodiment, when the output (Y) 104 is identified as erroneous or when the first accuracy level is below the predefined accuracy threshold, then the AI model 108 may automatically adjust at least one of the control parameters 110.

In an embodiment, the plurality of control parameters may correspond to external factors connected with an environment in which the system 100 may be working. The external factors may include external environmental conditions, ambient light, and ambient temperature. The at least one of the control parameters 110 may be adjusted in order to modify or recreate the function. The function may be modified or recreated to generate an adjusted output corresponding to the input 102 (X). The adjusted output may be generated based on the first accuracy level associated with the output 104 (Y). In an embodiment, for automatically adjusting the at least one of the control parameters 110 in order to modify the function, the AI model 108 may auto connect a second set of computational elements from the plurality of computational elements. In an embodiment, the second set of computational elements may include different combinations of computational elements when compared to the first set of computational elements. Alternatively, the first and second set of computational elements may include same combinations of computational elements, however, the input may change, thereby resulting in a different or modified function.

Additionally, in order to automatically create the function by the AI model 108, the AI model 108 may be trained based on a set of input data and an associated output data. The training of the AI model will be described in greater detail in conjunction with FIG. 4 and FIG. 5.

In an embodiment, the FPAA circuit 104, for example, may be an Field Programmable Translinear Array (FPTA)

circuit (or a translinear circuit) that may require equal number of transistors in clockwise and anti-clockwise direction and is governed by the equation (1), given below:

$$I_{Drain}=I_{Source}e^{(V_{drain}/V_{threshold})} \quad (1)$$

The equation (1) is used to evaluate drain current represented as "$I_{Drain}$". The "$I_{Source}$" represents source current. "$V_{drain}$" represents drain voltage and "$V_{threshold}$" represents a threshold voltage. As will be appreciated, the translinear integrated circuits may require low voltage swing in input and output leading to high speed, low power and low slew rate limit. Hence, the translinear integrated circuits may be best suited for the AI model 108. Thus, implementing and integrating the FPAA circuit 104 with the AI model 108 provides higher computational speed, parallel processing, and complex equations that are required by the AI model 108. Examples of the complex equations required by the AI model 108 may include, but are not limited to Multiply and Accumulate (MAC), Convolutional Neural Network (CNN), probability, multivariable calculus, linear algebra and numerical optimization.

Figure 2:
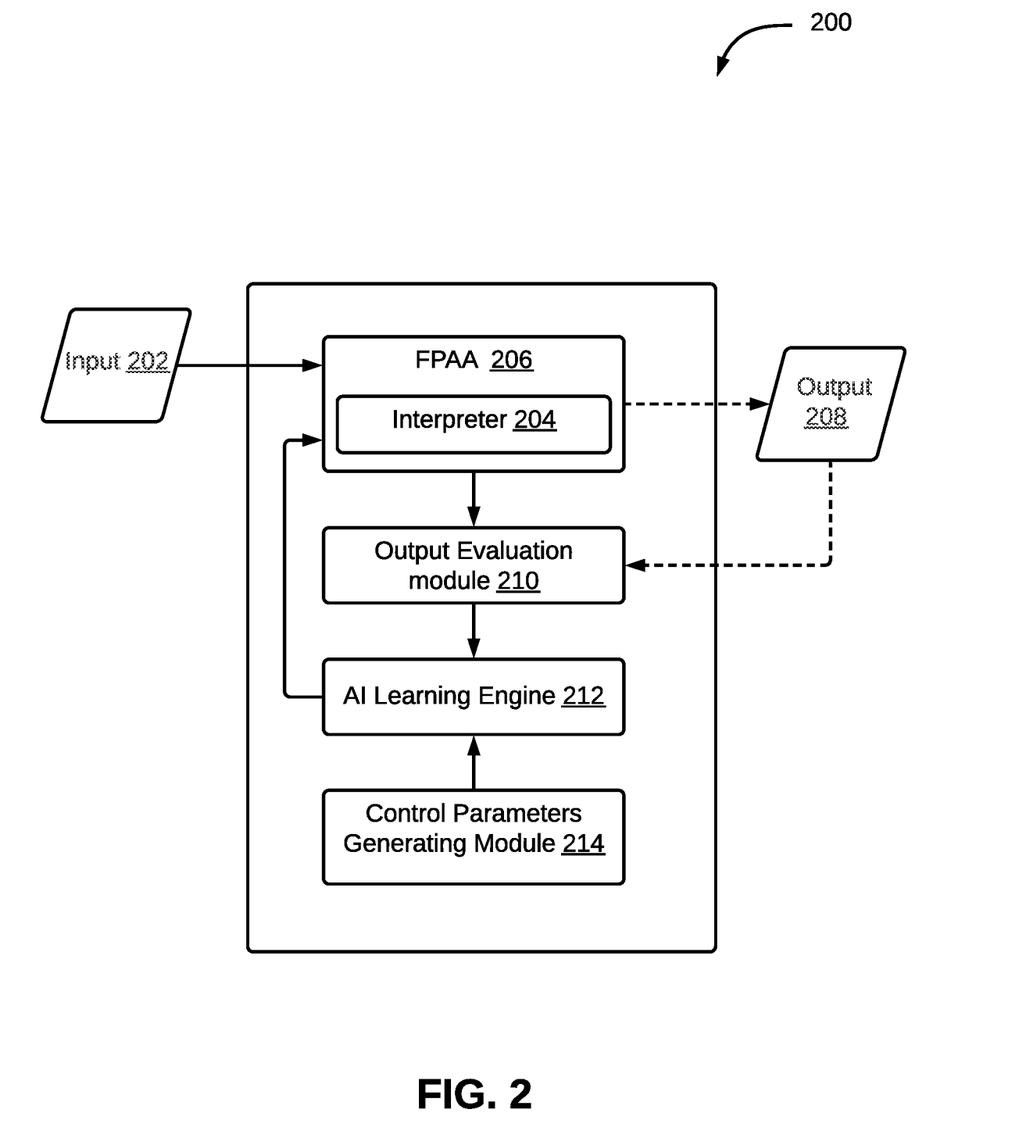
FIG. 2 is a functional block diagram of a system for integrating FPAA with AI, in accordance with an embodiment.

Referring now to FIG. 2, a functional block diagram of an exemplary system 200 for integrating an FPAA 206 with an AI learning engine 212 is illustrated, in accordance with an embodiment. With reference to FIG. 1, the exemplary system 200 may be implemented as at least one of a single integrated circuit, a co-processor, or an AI accelerator embedded in a large integrated circuit. In other words, the exemplary system 200 may correspond to an analog system implemented by integrating the FPAA 206 with the AI learning engine 212. The exemplary system 200 may further include an interpreter 204 within the FPAA 206, an output evaluation module 210, the AI learning engine 212, and a control parameters generating module 214. It should be noted that in an embodiment the FPAA 206 may not have a separate interpreter (for example, the interpreter 204). In another embodiment, the interpreter 204 may be located outside the FPAA 206 and may be communicatively coupled to the FPAA 206 in this case.

The exemplary system 200 may receive an input 202, which may correspond to any data or information for which a target output needs to be generated. By way of an example, the input 202 may include a set of images that include multiple variety of fruits. A user may want to identify and thereby determine name of each of the variety of fruits displayed within the set of images. Therefore, the user may provide the set of images to the exemplary system 200. The input 202 may first be received by the FPAA 206. The interpreter 204 within the FPAA 206 may interpret the input 202 and accordingly the FPAA 206 may create a function in order to provide the output 208 corresponding to the input 202. In an embodiment, if the FPAA 206 does not include the interpreter 204, the FPAA 206 may first interpret the input 202 may thereafter create the function to provide the output 208.

To this end, the AI learning engine 212 may auto-connect a first set of computational elements from a plurality of set of computation elements within the FPAA 206. The first set of computational elements may be identified and subsequently auto-connected by the FPAA 206. The first set of computational elements may be auto-connected by the FPAA 206 based on auto routing. In an embodiment, the AI learning engine 212 may directly identify and auto-connect the first set of computational elements. Further, based on execution of the function created, the FPAA 206 may generate the output 208.

The FPAA 206 may correspond to the translinear integrated circuits that requires equal number of transistors in clockwise and anti-clockwise direction. In other words, the FPAA 206 may include a series of analog building blocks connected through wire and switch fabric to accomplish reconfigurability similar to that of a Field Programmable Gate Arrays (FPGAs) for digital domain. In reference to FIG. 1, the FPAA 206 may correspond to the FPAA circuit 104. In an embodiment, the FPAA 206 may also be referred as the FPTA.

The FPAA 206 may share the output 208 with the output evaluation module 210. The output 208 may correspond to a result generated based on execution of the function generated by the AI module 212. The output evaluation module 210 may be configured to analyze the output in order to determine a first accuracy level associated with the output 210. In an exemplary embodiment, the output evaluation module 210 may compare the output 208 with a target or desired output to determine the first accuracy level. To this end, the output evaluation module 210 may first determine a similarity value between the output 208 with a target or desired output. The similarity value may then be compared with a similarity index to determine the first accuracy level. By way of an example, the similarity index may range from 1 to 5. Thus, when the similarity value determined for the output 208 is "2," then the accuracy level may be 40%. Similarly, when the similarity value for the output 208 is determined as "1" the accuracy level may be 20%. Additionally, when the similarity value associated with the output 208 is determined as "4", the accuracy level may be above 80%.

Once the first accuracy level associated with the output 208 is determined, a feedback comprising the first accuracy level may be generated by the output evaluation module 210. The output evaluation module 210 may then send the feedback that includes the first accuracy level to the AI learning engine 212.

The AI learning engine 212 may be configured to receive the feedback and may accordingly derive the first accuracy level associated with the output 204. With reference to FIG. 1, the AI learning engine 212 may be part of the AI model 108. Upon receiving the feedback, the AI learning engine 212 may be configured to automatically adjust at least one of the plurality of control parameters in order to modify the function that is used to generate an adjusted output (i.e., the output 208) via the FPAA 206.

In an embodiment, the plurality of control parameters may correspond to external factors connected with an environment in which the system 200 may be working. The plurality of control parameters may be generated and shared by the control parameters generating module 214 with the AI learning engine 212. The plurality of control parameters may correspond to external factors based on which a second set of computational elements are selected to be auto-connected in order to generate an adjusted output (i.e., the output 208, in this case) corresponding to the input 202. In other words, to maintain the same output in spite of the external factors, the plurality of control parameters may be generated. By way of an example, the exemplary system 200 is programed to identify color of bottle caps. In ideal ambient light conditions, the exemplary system 200 may accurately identify color of a cap. However, during poor ambient light conditions, the plurality of control parameters may be used to compensate for the poor ambient light conditions, such that, the exemplary system 200 may still be able to accurately identify color of the bottle caps. This is further explained in detail in conjunction with FIGS. 6A-6C.

Thus, to reiterate, the AI learning engine 212 may generate the modified function by auto-connecting the second set of computational elements from the plurality of computational elements within the FPAA 206, based on the plurality of control parameters. For auto-connecting the second set of computational elements, the AI learning engine 212 may fetch the plurality of computational elements from the FPAA 206. Further, the AI learning engine 212 may auto-connect the second set of computational elements in the FPAA 206, via the interpreter 204.

It should be noted that the exemplary system 200 may be implemented in programmable hardware devices such as programmable gate arrays, programmable array logic, programmable logic devices, or the like. In particular, the exemplary system 200 may be implemented as a single integrated circuit, a co-processor, or an AI accelerator embedded in the large Integrated circuit. An identified engine/module of executable code may, for instance, include one or more physical or logical blocks of computer instructions which may, for instance, be organized as an object, module, procedure, function, or other construct. Nevertheless, the executables of an identified engine/module need not be physically located together but may include disparate instructions stored in different locations which, when joined logically together, comprise the identified engine/module and achieve the stated purpose of the identified engine/module. Indeed, an engine or a module of executable code may be a single instruction, or many instructions, and may even be distributed over several different code segments, among different applications, and across several memory devices.

As will be appreciated by one skilled in the art, a variety of processes may be employed for integrating FPAA with AI. For example, the exemplary system 200 may manage integration of FPAA with AI, by the process discussed herein. In particular, as will be appreciated by those of ordinary skill in the art, control logic and/or automated routines for performing the techniques and steps described herein may be implemented by the system 200 by hardware, software, or combinations of hardware and software. For example, suitable code may be accessed and executed by the one or more processors on the system 200 to perform some or all of the techniques described herein. Similarly, application specific integrated circuits (ASICs) configured to perform some or all the processes described herein may be included in the one or more processors on the system 200.

Figure 3:
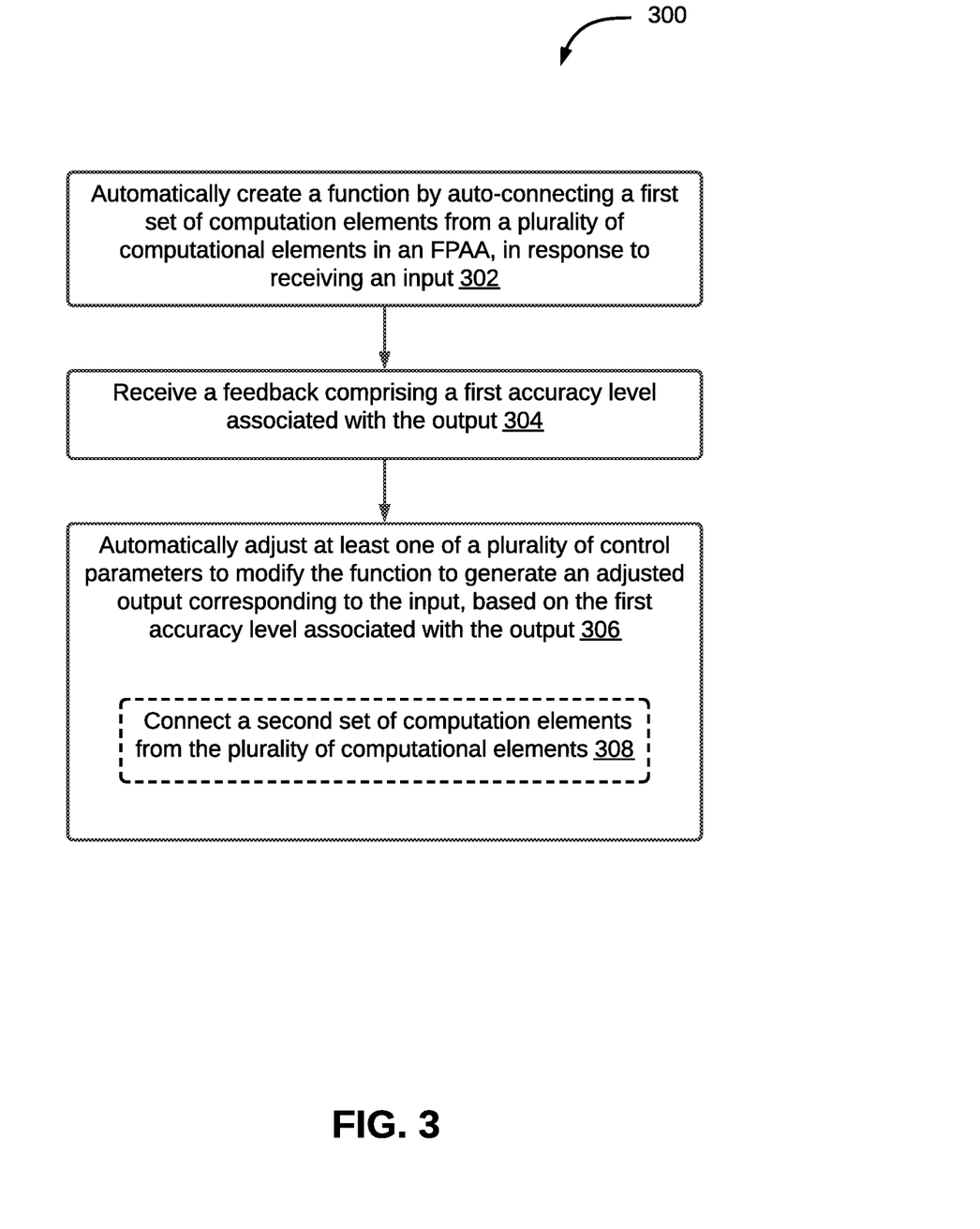
FIG. 3 is a flowchart of a method for integrating FPAA with AI for predicting an accurate output corresponding to an input, in accordance with an embodiment.

Referring now to FIG. 3, a flowchart of a method for integrating FPAA with AI for predicting an accurate output corresponding to an input is illustrated, in accordance with an embodiment. At step 302, an AI model (for example, the AI model 108) may automatically create a function upon receiving an input. The function may be created in order to generate an output associated with the input. The function may be automatically created by auto-connection of a first set of computational elements from a plurality of computational elements within an FPAA. With reference to FIG. 1 and FIG. 2, the FPAA may correspond to the FPAA circuit 104 and the FPAA 206. Each of the plurality of computational elements may perform one of subtraction, addition, multiplication, division, or logarithmic computation. It will be apparent to a person skilled in the art that multiple such computational elements and their combinations may be implemented within the FPAA. Thus, implementing and integrating the FPAA 104 with AI provides higher computational speed, parallel processing, and complex equations that are required by the AI. Examples of the complex equations required by the AI may include, but are not limited to MAC, CNN, probability, multivariable calculus, linear algebra and numerical optimization.

Thereafter, the created function may be executed in order to generate the output associated with the received input. Once the output associated with the input is generated, then at step 304, a feedback may be received corresponding to the output generated. The feedback may include a first accuracy level associated with the output. The output generated may be analyzed based on the first accuracy level associated with the output. In order to analyze the first accuracy level, it may be compared with a predefined accuracy threshold. Based on the analysis, at step 306, at least one of a plurality of control parameters may automatically be adjusted in order to modify the function created for generating the output. In an embodiment, the plurality of control parameters may correspond to external factors connected with an environment in which the system 200 may be working. The external factors may include external environmental conditions, ambient light, and ambient temperature Further, the function may be modified based on the first accuracy level in order to generate an adjusted output corresponding to the input. It should be noted that, that the function may be modified when the first accuracy level associated with the output is determined to be below the predefined accuracy threshold.

In order to automatically adjust at least one of the plurality of control parameters for modifying the function of step 306, at step 308, a second set of computational elements from the plurality of computational parameters may be auto-connected. Thereafter, based on the modified function, the adjusted output may be generated corresponding to the received input. It should be noted that, the process of generating the modified function may continue until the adjusted output generated is a target output (i.e., a correct output) corresponding to the received input. In other words, the iterations are carried out till the accuracy level of the target output is above the predefined accuracy threshold. As a result, the AI also performs self-learning in order to increase prediction accuracy. The method of generating the function in response to receiving the input has been further explained in detail in conjunction with exemplary embodiments given in FIG. 6A to FIG. 6C.

Figure 4:
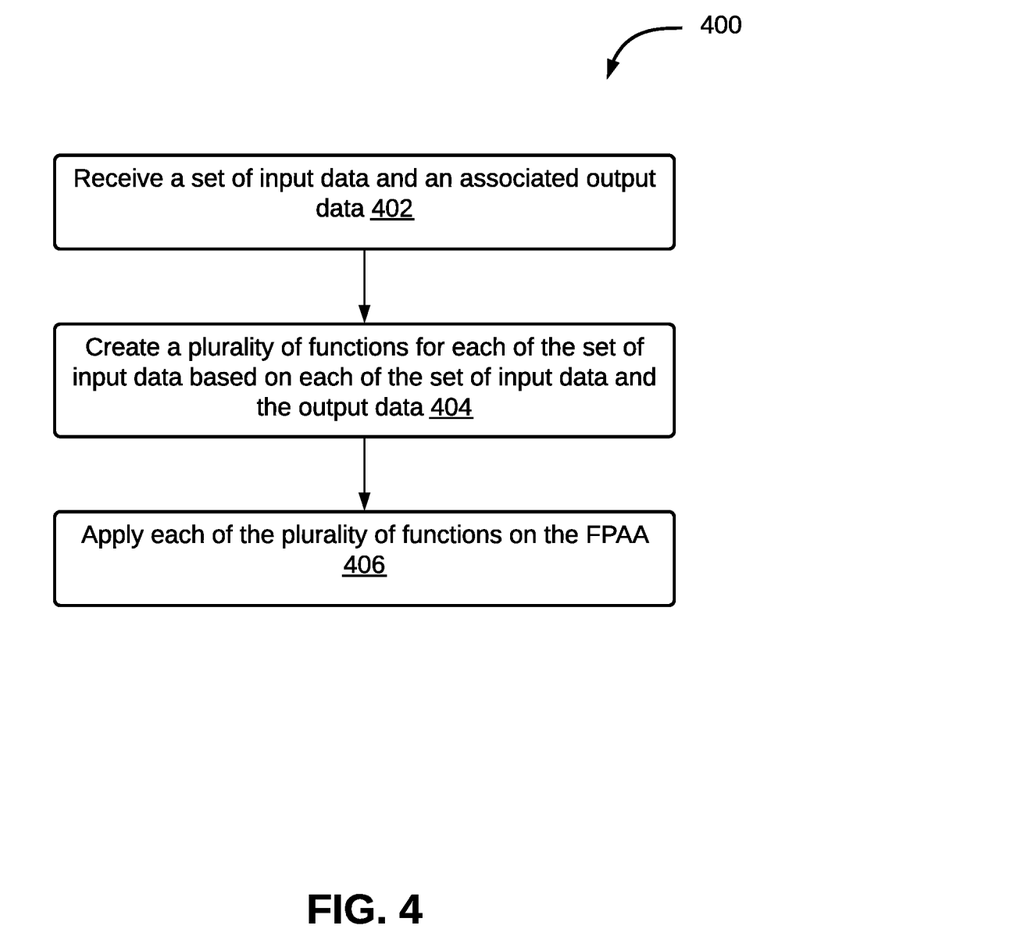
FIG. 4 is a flowchart of a method for training an AI model based on a set of input data and an associated output data, in accordance with an embodiment.

Referring now to FIG. 4, a flowchart of a method for training an AI model based on a set of input data and an associated output data is illustrated, in accordance with an embodiment. At step 402, a set of input data and an associated output data may be received by an AI model. With reference to FIG. 1, the AI model may correspond to the AI model 108. Upon receiving the set of input data, at step 404, the AI model may create a plurality of functions for each of the set of input data based on the set of input data and the output data. Moreover, each of the plurality of functions for each of the set of input data and an associated output data may be created based on equation (2) represented below:

$$Y = F(X) \tag{2}$$

In equation (2), 'X' may represent each of the set of input data and 'Y' may represent the output data associated with each of the set of input data. 'F' may represent each of the plurality of functions created for each of the set of input data, based on each of the input data and the associated output data. It should be noted that, at least one function from the plurality of function created may predict the output data for at least one input from the set of input data. This has been further explained in detail in conjunction with FIG. 6A to FIG. 6C.

Once the plurality of functions associated with each of the set of input data are created, then at step 606, the plurality of functions generated may be applied on an FPAA. With reference to FIG. 1, the FPAA may correspond to the FPAA circuit 104. The plurality of functions may be applied on the FPAA that is based on translinear integrated circuits. The translinear integrated circuits may include a plurality of transistors incorporated in a clockwise and anti-clockwise direction.

Figure 5:
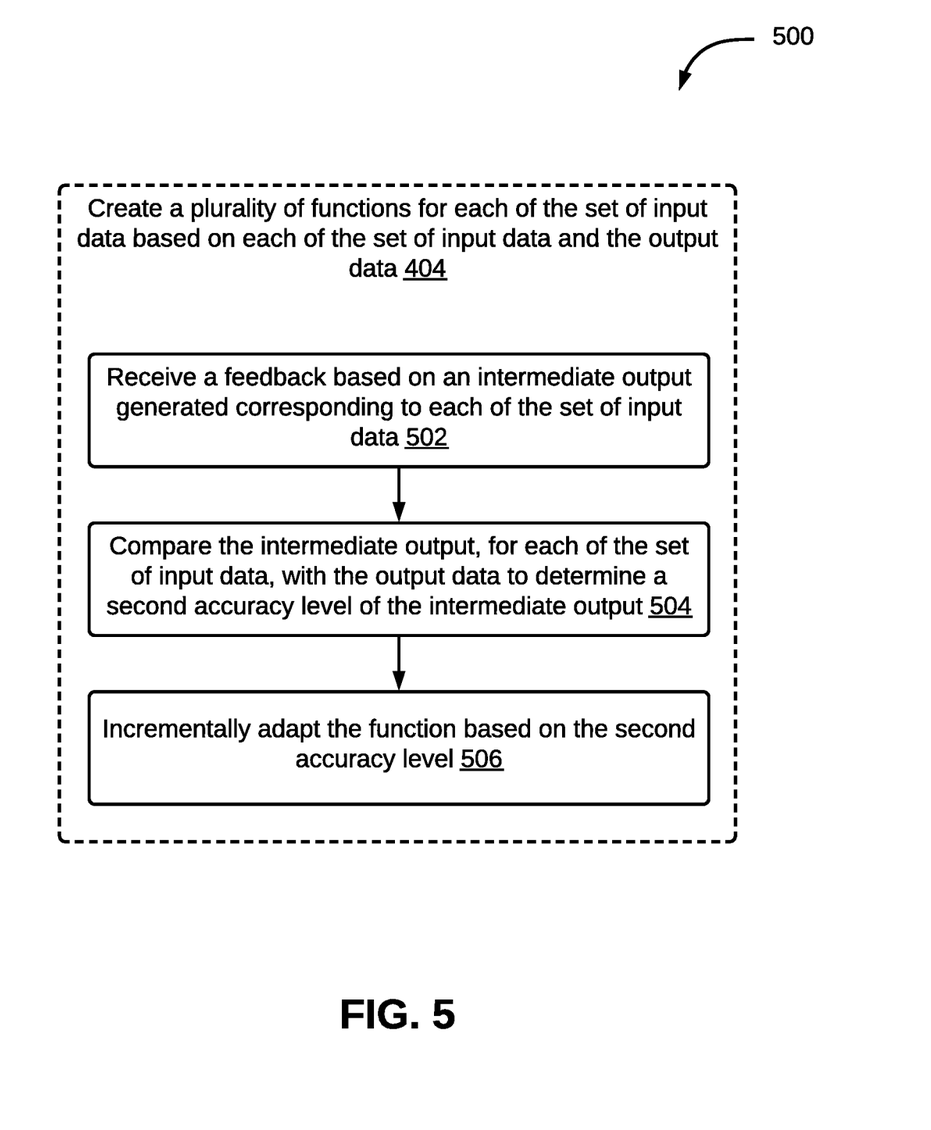
FIG. 5 is a flowchart of a method for creating a plurality of functions based on a set of input data and an associated output data, while training an AI model, in accordance with an embodiment.

Referring now to FIG. 5, a flowchart of a method for creating a plurality of functions based on a set of input data and an associated output data, while training an AI model is illustrated, in accordance with an embodiment. Referring back to FIG. 4, in order to create the plurality of functions corresponding to each of the set of input data as mentioned in step 404, at step 502, a feedback may be received by the AI model. The feedback may be received based on an intermediate output generated corresponding to each of the set of input data. The intermediate output may correspond to an output that includes error, as the intermediate output may not match with the output associated with each of the set of input data. The output associated with each of the set of input data may correspond to the target output. Once the intermediate output is generated, at step 504, the AI model may compare the intermediate output with the output associated with each of the set of input data. The intermediate output may be compared in order to determine a second accuracy level associated with the intermediate output.

Once the second accuracy level is determined, at step 506, the function corresponding to each of the set of input data may be incrementally adapted based on the second accuracy level. It should be noted that, the function may be incrementally adapted until the associated output data may match with each of the set of input data. As will be appreciated, based on mapping of the associated output matches with each of the set of input data, the plurality of function created. The plurality of function created may then be applied on the FPAA for future prediction of an output, in response to receiving an input.

Figure 6A:
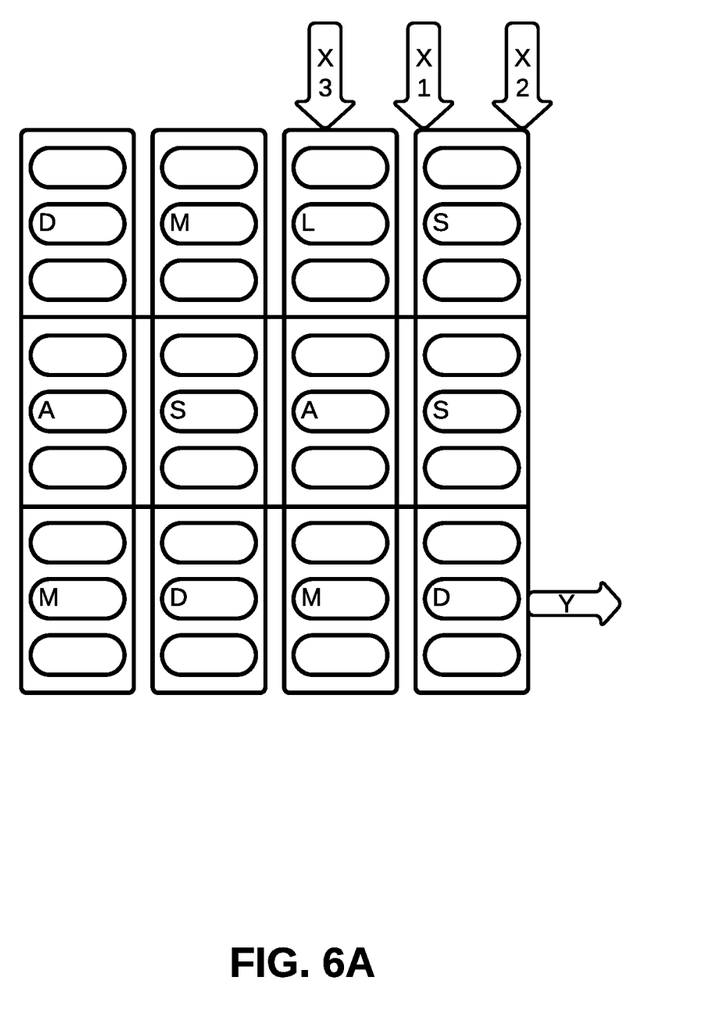
FIGS. 6A-6C depict auto-connecting of computation elements within an FPAA, via an AI, for predicting an output corresponding to an input, in accordance with an exemplary embodiment.
Figure 6B:
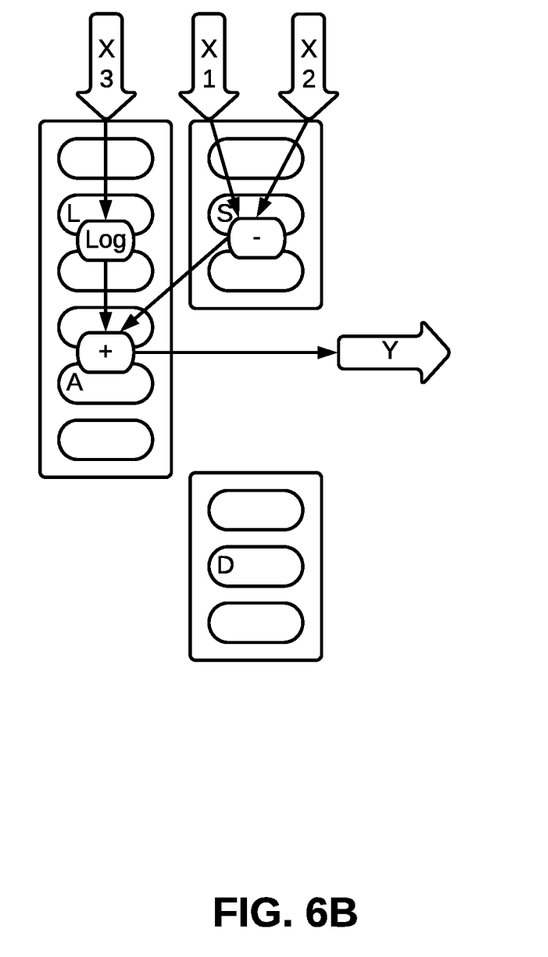
Figure 6C:
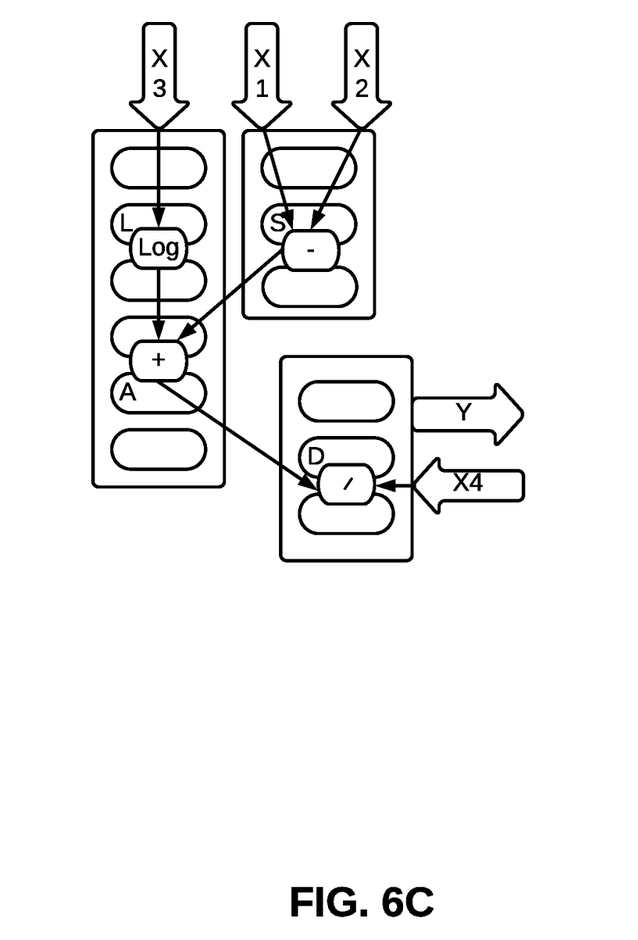

Referring now to FIG. 6A-6C, an exemplary embodiment for auto-connecting computation elements within an FPAA via an AI for predicting an output corresponding to an input is depicted, in accordance with an exemplary embodiment. The FPAA may correspond to the FPAA circuit 104. The FPAA may correspond to an electronic chip that includes multiple computational elements (or blocks) as represented by FIG. 6A. The FPAA of FIG. 6 represents initial state of the FPAA when no function has been applied on the FPAA. The plurality of computational elements in the FPAA of FIG. 6A may include D block, A block, M block, S block, and L block. The D block may represent divider translinear Circuit, the A block may represent adder translinear circuit, the M block may represent multiplier translinear circuit, S block may represent subtractor translinear circuit, and L block may represent log translinear circuit.

Consider a scenario, where an AI model is utilized at a factory for segregating a plurality of bottles. The plurality of bottles includes a set of red cap bottles and a set of yellow cap bottles. The AI model may correspond to the AI model 108. Initially, the AI model may be trained in a natural lighting (i.e., day light) to segregate the set of red cap bottles and the set of yellow cap bottles from the plurality of bottles. In order to train the AI model to identify each of the set of red cap bottles and to segregate the plurality of bottles, the AI model may be provided with a set of input data and an associated output data. The set of input data may include images of the plurality of bottles and the associated output data may include image of red cap bottle. Upon receiving the set of input data and the associated output data, the AI model may generate a function for identifying each of the set of red cap bottles from the plurality of bottles. The FPAA of FIG. 6A may be programmed based on the function generated to identify each of the set of red cap bottles at the factory in natural lighting. The function may be generated by auto-connecting a first set of computation blocks (or elements). The function generated for identifying each of the set of red cap bottles from the plurality of bottles may be represented via an equation (3):

$$\text{Output } (Y) = (X1 - X2) + \log(X3) \qquad (3)$$

The output (Y) of equation 3 may correspond to the associated output data, i.e., the image of red cap bottle. Moreover, X1, X2, and X3 may represent the set of input data, i.e., images of the plurality of bottles captured by the camera setup at the factory. Once the AI model is trained, the AI model may apply the function generated for identifying each of the set of red cap bottles as represented by equation (3) to an FPAA (which may be an FPTA). The function generated for identifying each of the set of red cap bottles may be applied to the FPAA as represented in FIG. 6B. In order to program the FPAA to identify each of the set of red cap bottles, only those computational elements that may be configured to execute the function of the equation (3) may be selected in an optimized way and then auto routed. Once the FPAA is programmed to identify each of the set of red cap bottles, the FPAA may be represented as depicted in FIG. 6B. In other words, the FPAA of FIG. 6B represents the FPAA programmed to identify each of the set of red cap bottles during day light operations of a machine. Once the AI model is trained and the FPAA is programmed to identify each of the set of red cap bottles, the AI may be used to segregate the plurality of bottles at the factory.

Considering another scenario, where management of the factory decides to operate in night shifts for segregating the plurality of bottles in order to ramp up their production. Now since, the AI model is trained to segregate the plurality of bottles in natural lighting, therefore, utilizing the same AI model in night light may result in machine vision to be erroneous, as artificial illumination in night may cause a tint on bottle caps. In order to retain the same output, the AI model may retrain itself to segregate the plurality of bottles in night light (or artificial light) as well.

While operating machine in night lights, suppose, the AI model receives an image of a red cap bottle as an input from the camera stationed at the factory. Based on the image received, the AI model may automatically modify the function represented by the equation (3). The modified function created may generate an output associated with the image. The output may depict that the image received is of a red cap bottle or not. Once the output is generated, the AI model may receive a feedback that includes an accuracy level associated with the output. Based on the accuracy level associated with the output, the AI model may determine whether the generated output is accurate or not. In other words, the AI model may determine whether the output generated is associated with the image of the red cap bottle received as the input, based on the accuracy level. If the accuracy level associated with the output is below a predefined accuracy threshold, then the AI model may modify the function thus created.

In order to modify the function, the AI model may automatically adjust at least one of the control parameters to generate an adjusted output corresponding to the input (i.e., correctly identifying the image of the red cap bottle). In an embodiment, the plurality of control parameters may correspond to external factors connected with an environment in which the AI model may be working. In this case, the external factor may be the artificial illumination that causes tint on bottles while capturing images.

Moreover, in order to automatically adjust the at least one of the plurality of control parameters to modify the function, a second set of computation elements may be auto-connected from the plurality of computational elements present in the FPAA. The auto-connection of the second set of computational elements is depicted by way of FIG. 6C. The modified function representing auto-connection of the second set of computation elements may be represented by equation (4) given below:

$$\text{Output}(Y)=[(X1-X2)+\log(X3)]/X4 \quad (4)$$

As is apparent, in this scenario, for generating the modified function, the AI model may use one more divider block of the FPAA to generate the adjusted output correspond to the received input.

Various embodiments provide method and system for integrating FPAA with AI. The disclosed method and system may help to automatically modify a function by adjusting at least one of a plurality of control parameters in order to produce target output (i.e., the output associated with the input). The disclosed method and system may automatically create the function by auto-connecting a first set of computation elements from a plurality of computational elements in an FPAA, in response to receiving an input utilizing an AI model. In an embodiment, the function is created in order to generate an output associated with the input. Further, the system and method may receive a feedback comprising a first accuracy level associated with the output. Thereafter, the system and method may automatically adjust at least one of a plurality of control parameters to modify the function in order to generate an adjusted output corresponding to the input, based on the first accuracy level associated with the output.

The system and method provide some advantages like utilization of analog computation in order to meet computational speed required by the AI model. In addition, analog processors may be best suited to provide required power by the AI model for searching new architecture. Moreover, inherent nature of the AI model allows higher tolerance for analog computation due to basic nature of the AI model i.e., learning on error outputs. Further, the AI model with analog computation, decimate application cost due to its reusability and being field programmable. Additionally, the AI model with analog computation may act as a co-processor in order to reduce computational and power burden of a Central Processing Unit (CPU).

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Although the present invention has been described in connection with some embodiments, it is not intended to be limited to the specific form set forth herein. Rather, the scope of the present invention is limited only by the claims.

Additionally, although a feature may appear to be described in connection with particular embodiments, one skilled in the art would recognize that various features of the described embodiments may be combined in accordance with the invention.

Furthermore, although individually listed, a plurality of means, elements or process steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather the feature may be equally applicable to other claim categories, as appropriate.

What is claimed is:

1. A method for integrating Field Programmable Analog Array (FPAA) with Artificial Intelligence (AI), the method comprising:

automatically creating, by an AI model, a function by auto-connecting a first set of computation elements from a plurality of computational elements in the FPAA, in response to receiving an input, wherein the function generates an output associated with the input, and wherein the plurality of computational elements comprises at least one of a divider translinear circuit, an adder translinear circuit, a multiplier translinear circuit, a subtractor translinear circuit, or a logarithmic translinear circuit;

receiving, by the AI model, a feedback comprising a first accuracy level associated with the output; and automatically adjusting, by the AI model, at least one of a plurality of control parameters to modify the function to generate an adjusted output corresponding to the input, based on the first accuracy level associated with the output, wherein the plurality of control parameters corresponds to external environmental factors affecting performance of the FPAA in generating the output, and wherein automatically adjusting the at least one of the plurality of control parameters comprises auto-connecting a second set of computation elements from the plurality of computational elements to compensate for the external environmental factors;

reconfiguring the FPAA, by the AI model, to apply a modified function based on the control parameters, wherein the control parameters are generated in response to ambient lighting conditions to adapt the configuration of the FPAA and maintain the output accuracy, wherein the FPAA is a Field Programmable Translinear Array (FPTA); and reprogramming the FPTA, by the AI model, to perform a task comprising identifying a visual attribute of an object, wherein the reprogramming maintains identification accuracy under non-ideal environmental conditions.

2. The method of claim 1, wherein the FPAA comprises each of the plurality of computational elements, and wherein each of the plurality of computational elements is configured to perform one of subtraction, addition, multiplication, division, or logarithmic computation.

3. The method of claim 2, wherein the FPAA and the AI model are implemented as at least one of a single integrated circuit, a co-processor, or an AI accelerator embedded in an integrated circuit.

4. The method of claim 1, further comprises training the AI model, wherein the training comprises:
  receiving, by the AI model, a set of input data and an associated output data;
  creating, by the AI model, a plurality of functions for each of the set of input data based on each of the set of input data and the output data; and
  applying, by the AI model, each of the plurality of functions on the FPAA.

5. The method of claim 4, wherein creating the plurality of functions, further comprises:
  receiving, by the AI model, a feedback based on an intermediate output generated corresponding to each of the set of input data;
  comparing, by the AI model, the intermediate output, for each of the set of input data, with the output data to determine a second accuracy level of the intermediate output; and
  incrementally adapting, by the AI model, the function based on the second accuracy level.

6. A single integrated circuit, the single integrated circuit comprising:
  a Field Programmable Analog Array (FPAA) comprising a plurality of computational elements; and
  an Artificial Intelligence (AI) model including an AI learning engine, the AI model configured to:
  automatically create a function by auto connecting a first set of computation elements from a plurality of computational elements in the FPAA, in response to receiving an input, wherein the function generates an output associated with the input, and wherein the plurality of computational elements comprises at least one of a divider translinear circuit, an adder translinear circuit, a multiplier translinear circuit, a subtractor translinear circuit, or a logarithmic translinear circuit;
  receive a feedback comprising the first accuracy level associated with the output; and
  automatically adjust at least one of a plurality of control parameters to modify the function to generate an adjusted output corresponding to the input, based on the first accuracy level associated with the output,
    wherein the plurality of control parameters corresponds to external environmental factors affecting performance of the FPAA in generating the output, and
    wherein automatically adjusting the at least one of the plurality of control parameters comprises auto-connecting a second set of computation elements from the plurality of computational elements to compensate for the external environmental factors;
  reconfigure the FPAA to apply a modified function based on the control parameters, wherein the control parameters are generated in response to ambient lighting conditions to adapt the configuration of the FPAA and maintain the output accuracy,
    wherein the FPAA is a Field Programmable Translinear Array (FPTA); and
  reprogram the FPTA to perform a task comprising identifying a visual attribute of an object, wherein the reprogramming maintains identification accuracy under non-ideal environmental conditions.

7. The single integrated circuit of claim 6, wherein the FPAA comprises each of the plurality of computational elements, and wherein each of the plurality of computational elements is configured to perform one of subtraction, addition, multiplication, division, or logarithmic computation.

8. The single integrated circuit of claim 7, wherein the FPAA and the AI model are implemented as at least one of a single Integrated Circuit, a co-processor, or an AI accelerator embedded in an integrated circuit.

9. The single integrated circuit of claim 6, wherein the AI learning engine is configured to train the AI model based on a log database, and wherein training comprises:
  receiving, by the AI model, a set of input data and an associated output data;
  creating, by the AI model, a plurality of functions for each of the set of input data based on each of the set of input data and the output data; and
  applying, by the AI model, each of the plurality of functions on the FPAA.

10. The single integrated circuit of claim 9, wherein the AI learning engine creates the plurality of functions by:
  receiving, by the AI model, a feedback based on an intermediate output generated corresponding to each of the set of input data;
  comparing, by the AI model, the intermediate output, for each of the set of input data, with the output data to determine the accuracy level of the intermediate output; and
  incrementally adapting, by the AI model, the function based on the determined accuracy level.

11. An Artificial Intelligence (AI) accelerator, the system comprising:
  a Field Programmable Analog Array (FPAA) comprising a plurality of computational elements; and
  an AI model including an AI learning engine, the AI model configured to:
  automatically create a function by auto connecting a first set of computation elements from a plurality of computational elements in the FPAA, in response to receiving an input, wherein the function generates an output associated with the input, and wherein the plurality of computational elements comprises at least one of a divider translinear circuit, an adder translinear circuit, a multiplier translinear circuit, a subtractor translinear circuit, or a logarithmic translinear circuit;
  receive a feedback comprising the first accuracy level associated with the output; and
  automatically adjust at least one of a plurality of control parameters to modify the function to generate an adjusted output corresponding to the input, based on the first accuracy level associated with the output,
    wherein the plurality of control parameters corresponds to external environmental factors affecting performance of the FPAA in generating the output, and
    wherein automatically adjusting the at least one of the plurality of control parameters comprises auto-connecting a second set of computation elements from the plurality of computational elements to compensate for the external environmental factors:
  reconfigure the FPAA to apply a modified function based on the control parameters, wherein the control parameters are generated in response to ambient lighting conditions to adapt the configuration of the FPAA and maintain the output accuracy,
    wherein the FPAA is a Field Programmable Translinear Array (FPTA); and
  reprogram the FPTA to perform a task comprising identifying a visual attribute of an object, wherein the reprogramming maintains identification accuracy under non-ideal environmental conditions.

12. The AI accelerator of claim 11, wherein the FPAA comprises each of the plurality of computational elements, and wherein each of the plurality of computational elements is configured to perform one of subtraction, addition, multiplication, division, or logarithmic computation.

13. The AI accelerator of claim 12, wherein the FPAA and the AI model are implemented as at least one of a single Integrated Circuit, a co-processor, or an AI accelerator embedded in a large integrated circuit.

14. The AI accelerator of claim 11, wherein the AI learning engine is configured to train the AI model based on a log database, and wherein training comprises:
   receiving, via the AI model, a set of input data and an associated output data;
   creating, via the AI model, a plurality of functions for each of the set of input data based on each of the set of input data and the output data; and
   applying, via the AI model, each of the plurality of functions on the FPAA.

15. The AI accelerator system of claim 11, wherein the AI learning engine creates the plurality of functions by:
   receiving, via the AI model, a feedback based on an intermediate output generated corresponding to each of the set of input data;
   comparing, via the AI model, the intermediate output, for each of the set of input data, with the output data to determine the accuracy level of the intermediate output; and
   incrementally adapting, via the AI model, the function based on the determined accuracy level.

16. The AI accelerator of claim 11, wherein the AI accelerator is embedded in an integrated circuit.

* * * * *